US009676922B2

(12) United States Patent
Xie et al.

(10) Patent No.: US 9,676,922 B2
(45) Date of Patent: Jun. 13, 2017

(54) HEAT AND MOISTURE RESISTANT ACRYLIC ADHESIVE COMPOSITION

(71) Applicant: IPS, CORPORATION-WELD-ON DIVISION, Compton, CA (US)

(72) Inventors: Xiaoyi Xie, Diamond Bar, CA (US); Andreas Schneider, Fullerton, CA (US)

(73) Assignee: IPS, Corporation—Weld-On Division, Compton, CA (US)

( * ) Notice: Subject to any disclaimer, the term of this patent is extended or adjusted under 35 U.S.C. 154(b) by 0 days.

(21) Appl. No.: 14/705,260

(22) Filed: May 6, 2015

(65) Prior Publication Data

US 2015/0361313 A1 Dec. 17, 2015

Related U.S. Application Data

(60) Provisional application No. 62/010,623, filed on Jun. 11, 2014.

(51) Int. Cl.

| | |
|---|---|
| ***C08K 5/101*** | (2006.01) |
| ***C08K 5/11*** | (2006.01) |
| ***C08K 5/36*** | (2006.01) |
| ***C08K 5/3432*** | (2006.01) |
| ***C09J 151/00*** | (2006.01) |
| *B29C 65/48* | (2006.01) |
| *B29C 65/00* | (2006.01) |

(52) U.S. Cl.

CPC ................ *C08K 5/101* (2013.01); *C08K 5/11* (2013.01); *C08K 5/3432* (2013.01); *C08K 5/36* (2013.01); *C09J 151/00* (2013.01); *B29C 65/485* (2013.01); *B29C 66/52* (2013.01); *B29C 66/5344* (2013.01); *B29C 66/71* (2013.01)

(58) Field of Classification Search

CPC ........ C08K 5/101; C08K 5/11; C08K 5/3432; C08K 5/36; C08J 151/00; B29C 65/485; B29C 66/52; B29C 66/5344; B29C 66/71

See application file for complete search history.

(56) References Cited

U.S. PATENT DOCUMENTS

| | | | | |
|---|---|---|---|---|
| 3,890,407 | A | 6/1975 | Briggs, Jr. et al. | |
| 3,984,497 | A | 10/1976 | Owens et al. | |
| 3,991,008 | A | 11/1976 | Temin et al. | |
| 4,034,013 | A | 7/1977 | Lane | |
| 4,096,202 | A | 6/1978 | Farnham et al. | |
| 4,106,971 | A | 8/1978 | Briggs, Jr. et al. | |
| 4,182,644 | A | 1/1980 | Briggs, Jr. et al. | |
| 4,306,040 | A | 12/1981 | Baer | |
| 4,430,480 | A | 2/1984 | Melody et al. | |
| 4,536,546 | A | 8/1985 | Briggs | |
| 4,569,976 | A | 2/1986 | Zimmerman et al. | |
| 4,645,810 | A | 2/1987 | Fischer | |
| 5,112,691 | A | 5/1992 | Briggs et al. | |
| 5,459,206 | A * | 10/1995 | Somemiya et al. | C08F 283/122 525/479 |
| 5,656,345 | A | 8/1997 | Strand et al. | |
| 6,602,958 | B2 | 8/2003 | Briggs et al. | |
| 7,479,528 | B2 | 1/2009 | Wang et al. | |
| 7,776,963 | B2 | 8/2010 | Wang et al. | |
| 2007/0040151 | A1 | 2/2007 | Utterodt et al. | |
| 2012/0302695 | A1 * | 11/2012 | Osae et al. ................ | C09J 4/06 524/504 |
| 2013/0261247 | A1 | 10/2013 | Briggs et al. | |

OTHER PUBLICATIONS

Notification of Transmittal of the International Search Report and the Written Opinion of the International Searching Authority, or the Declaration corresponding to International Application No. PCT/US2015/029571 mailed Jul. 23, 2015.

* cited by examiner

*Primary Examiner* — Nathan M Nutter
(74) *Attorney, Agent, or Firm* — Myers Bigel, P.A.

(57) ABSTRACT

A two part heat and moisture resistant acrylic adhesive composition is provided and includes an initiator part comprising at least one polymer dissolved in a (meth)acrylate monomer and a free radical initiator and an activator part comprising at least one polymer dissolved in a (meth) acrylate monomer, a pyridinic reducing agent, an organometallic curing promoter and a thiourea accelerator.

26 Claims, No Drawings

HEAT AND MOISTURE RESISTANT ACRYLIC ADHESIVE COMPOSITION

CROSS-REFERENCE TO RELATED APPLICATION

This application claims priority to U.S. Provisional Application Ser. No. 62/010,623, filed Jun. 11, 2014, the disclosure of which is incorporated by reference in its entirety.

FIELD OF THE INVENTION

The present invention relates to a heat and moisture resistant acrylic adhesive composition, and more particularly to a heat and moisture resistant reactive acrylic adhesive composition useful for adhesively joining two or more pipe sections and retaining sufficient bond strength under pressure at hot water temperatures.

BACKGROUND OF THE INVENTION

Acrylic-based adhesives are well-known in applications requiring fast curing at ambient or room temperatures and the adhesive compound being tough and flexible after cure. See, for example, U.S. Pat. Nos. 4,536,546, 5,656,345, 6,602,958, 7,479,528, 5,112,691, and 7,776,963. These acrylic-based adhesives are sometimes in the form of a two part system that is stored separately prior to use and then mixed at the time of use. These two part acrylic-based adhesives, however, have limitations and performance problems. Storage stability is often a concern. Low impact strength is another weakness of these adhesives. Heat and moisture resistance at elevated temperatures is another property sometimes lacking. With increased scrutiny of chemical contaminants entering water supplies in potable water applications, avoidance of migration of unreacted components or ingredients is strongly desired. These limitations and performance properties can be significant issues when trying to bond thermoplastic pipe and fittings made of, for example, polyvinyl chloride (PVC), chlorinated polyvinyl chloride (CPVC) and/or poly(acrylonitrile-butadiene-styrene) (ABS) materials.

Thus there is a need for an improved two part reactive acrylic-based adhesive system or composition having desirable storage stability, impact strength, heat and moisture resistance properties, and having low concentrations of unreacted components to avoid migration of chemical contaminants into the potable water systems.

SUMMARY OF THE INVENTION

A two part heat and moisture resistant acrylic adhesive composition is provided and includes: a) an initiator part comprising at least one polymer dissolved in a (meth) acrylate monomer and a free radical initiator; and b) an activator part comprising at least one polymer dissolved in a (meth)acrylate monomer, a pyridinic reducing agent, an organometallic curing promoter and a thiourea accelerator.

DETAILED DESCRIPTION OF VARIOUS EMBODIMENTS

The presently disclosed subject matter will now be described more fully hereinafter. However, many modifications and other embodiments of the presently disclosed subject matter set forth herein will come to mind to one skilled in the art to which the presently disclosed subject matter pertains having the benefit of the teachings presented in the foregoing descriptions. Therefore, it is to be understood that the presently disclosed subject matter is not to be limited to the specific embodiments disclosed and that modifications and other embodiments are intended to be included within the scope of the appended claims.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity. All published documents including U.S. patents and patent applications mentioned anywhere in this application are hereby expressly incorporated by reference in their entirety.

The term "about", as used herein with respect to a value or number, means that the value or number can vary by +/−20%, 10%, 5%, 1%, 0.5%, or even 0.1%.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

The present invention provides a two part heat and moisture resistant acrylic adhesive composition. The composition comprises an initiator part and an activator part which is kept separated prior to use. The initiator part comprises at least one polymer dissolved in a (meth)acrylate monomer and a free radical initiator. The activator part comprises at least one polymer dissolved in a (meth)acrylate, a pyridinic reducing agent, an organometallic curing promoter and a thiourea accelerator. The initiator part may include a co-initiator. The activator part may include a crosslinker.

The two part heat and moisture resistant acrylic adhesive composition is particularly adapted for use in PVC, CPVC and ABS plastic pipes and fittings. Moreover, the adhesive composition is adaptable to the three major standards (IPS in North America, DIN in Europe and JIS in Japan) regulating the fit between piping and fittings. In North America, the standard fit is a conical design with the mouth of the socket larger than the bottom of the socket. The pipe outside diameter (OD) is fixed for a given pipe size. The inside diameter varies depending on the Schedule which defines the thickness (e.g. Schedule 40 or Schedule 80). In Europe, the standard fit is a parallel design with identical dimensions at the mouth and the bottom of the socket. The pipe OD is fixed for a given pipe size. The wall thickness varies depending on the pressure rating group (e.g. PN10 or PN16). In Japan, the standard fit is an elongated conical design with the mouth of the socket larger than the bottom of the socket. The pipe OD is fixed for a given pipe size. The wall thickness varies depending on the pressure rating group. The adhesive composition of the invention may be used with all three standards.

In both the initiator part and the activator part at least one polymer is dissolved in a (meth)acrylate monomer. Suitable (meth)acrylate monomers include $C_1$ to $C_{20}$ alkyl esters of methacrylic acid. Exemplary (meth)acrylate monomers include methyl (meth)acrylate, ethyl (meth)acrylate, propyl (meth)acrylate, isopropyl (meth)acrylate, isobutyl (meth) acrylate, sec-butyl (meth)acrylate, t-butyl (meth)acrylate, tetrahydrofurfuryl (meth)acrylate, 2-ethyl hexyl (meth)acrylate, hydroxyethyl (meth)acrylate, dicyclopentadienyl (meth)acrylate, isobornyl (meth)acrylate, and mixtures and blends thereof. In one embodiment, the (meth)acrylate monomers may be the $C_1$ to $C_4$ alkyl esters of methacrylic acid. In another embodiment, the (meth)acrylate monomer may be methyl methacrylate.

Suitable polymers include homopolymers such as poly (methyl methacrylate) (PMMA), polystyrene (PS), polydicyclopentadiene (PDCPD), copolymers such as poly (methacrylate-acrylonitrile-butadiene-styrene) (MABS), poly(acrylate-styrene-acrylonitrile) (ASA), poly(acrylonitrile-butadiene-styrene) (ABS), and block copolymers of butadiene or isoprene with styrene, acrylonitrile such as styrene-butadiene-styrene (SBS), styrene-isoprene-styrene (SIS), and mixtures and blends thereof. A core-shell graft copolymer can be optionally added to the adhesive composition to modify the flow properties of the uncured adhesive composition and to improve the fracture toughness of the cured adhesive composition. The core-shell graft copolymers have a rubbery core made from polymers of "soft" or "elastomeric" monomers such as butadiene or ethyl acrylate, and a hard shell made from "hard" monomers such as methyl methacrylate, styrene or acrylonitrile. A common core-shell graft copolymer is a MBS polymer which is made by polymerizing methyl methacrylate in the present of poly (butadiene-styrene) copolymer rubber. The core-shell graft polymers used in this invention typically may swell in the monomer compositions but do not dissolve therein. Additionally useful core-shell graft copolymers are described in U.S. Pat. Nos. 3,984,497, 4,034,013, 4,096,202, 4,306,040, and 5,112,691. Other impact modifiers and/or toughening agents can also be added to the adhesive composition.

Suitable free radical initiators include organic peroxides, organic hydroperoxides, peresters and peracids. The initiator (or a catalyst as they are sometimes referred) may be used to initiate or start polymerization. Exemplary free radical initiators include benzoyl peroxide, cumene hydroperoxide, tertiary butyl hydroperoxide, dicumyl peroxide, tertiary butyl peroxyacetate, tertiary butyl perbenzoate, and mixtures thereof. Typically the free radical initiators may be present in amounts of up to about 10 percent by weight of the adhesive composition and often about 0.05 to about 3 percent by weight.

Both the initiator part and the activator part may include an inhibitor or stabilizer to prevent premature polymerization and to provide a desirable working time of the adhesive. The common inhibitors or stabilizers may be phenols such as butylated hydroxyl toluene (BHT), 2,6-di-tert-butyl-4-(dimethylaminomethyl)phenol, quinones (benzoquinone), hydroquinones (hydroquinone monomethyl ether, MEHQ), and the like. Typically, the inhibitor may be present in amounts of up to about 5 percent by weight of the adhesive composition and often about 0.01 to about 2 percent by weight.

Optionally, one or more organic acids, such as carboxylic acids, may be employed in the adhesive formulation to accelerate cure time and to enhance adhesion of the adhesive to the substrates or components. The carboxylic acids, preferably unsaturated or polymerizable, may be present in amount of up to about 20 percent by weight of the adhesive composition and often up to about 10 percent by weight. Exemplary carboxylic acids include methacrylic acid, maleic acid, acrylic acid, crotonic acid, fumaric acid, malonic acid, acetylene dicarboxylic acid, dibromo maleic citranoic acid, mesaconic acid, and oxalic acid. By adding one or more carboxylic acids, particularly strong organic carboxylic acids, to the present adhesive compositions, the bonding characteristics of the adhesive compositions to the subsequently bonded structural components and parts may be improved.

A reducing agent may be included in the activator part of the composition, to co-react with the free radical initiator. The reducing agent may be present in an amount up to about 15 percent, and typically about 0.01 to about 5 percent. Exemplary reducing agents include tertiary amines and aldehyde amine reaction products. Suitable tertiary amines may include N,N-dimethyl aniline, N,N-diethyl toluidine, N,N-bis(2-hydroxy ethyl) toluidine and the like. In one embodiment, the reducing agent may be a pyridinic compound such as aldehyde-amine reaction products including such compositions as butyraldehyde-aniline and butyraldehyde-butylamine derivatives whose active ingredient is a dihydropyridine (DHP) formed from condensation of three moles of aldehyde with one mole of amine. More recently, DHP-enriched versions of these compositions have been made available. One such material is Reillycat ASY-2, available from Reilly Industries, Inc. and is 3,5-diethyl-1-phenyl-2-propyl-1,2 dihydropyridine (PDHP). This reducing system is often used in combination with a sulfonyl chloride such as described, for example, in U.S. Pat. Nos. 3,890,407 and 4,182,644.

Suitable thioureas include monosubstituted thiourea compounds with a heteroatom, i.e., oxygen, nitrogen or sulfur, in a position beta to the nitrogen of the thiourea bearing the substituent, or a monosubstituted thiourea comprising an ether oxygen atom in a position gamma to the substituted nitrogen of the thiourea, such as described in U.S. Pat. Nos. 3,991,008 and 4,569,976. Additionally useful thioureas and derivatives are described in U.S. Patent Publication No. 2007/0040151. Exemplary thioureas include ethylene thiourea, 1-acetyl-2-thiourea, 1-(2-pyridyl)-2-thiourea. The thiourea is present up to about 5 percent by weight of the adhesive composition, and often about 0.01 to about 2 percent by weight.

In addition, multifunctional monomers and oligomers including those derived from epoxy and polyurethane backbones may be utilized as crosslinkers to enhance the performances such as heat resistance of the adhesive. The crosslinking monomers include multifunctional (meth)acrylate monomers, such as, but not limited to, di- or trifunctional (meth)acrylates like hexanediol di(meth)acrylate, trimethylol propane tri(meth)acrylate (TMPTMA), polyethylene glycol di(meth)acrylates, ethylene glycol dimethacrylate (EGDMA), diethylene glycol dimethacrylate, triethylene glycol dimethacrylate (TEGDMA), tetraethylene glycol di(meth)acrylate, dipropylene glycol dimethacrylate, di-(pentamethylene glycol) dimethacrylate, diglycerol tetramethacrylate, tetramethylene dimethacrylate, ethylene dimethacrylate, neopentyl glycol diacrylate, trimethylol propane triacrylate and bisphenol-A di(meth)acrylates, such as ethoxylated bisphenol-A di(meth)acrylate (EBPADMA), bisphenol-F di(meth)acrylates, such as ethoxylated bisphenol-F di(meth)acrylate, and urethane dimethacrylate (UDMA). The crosslinking monomer component may be used in an amount ranging from about 0.01 to about 20 percent by weight.

Suitable organo-metallic curing promoters include organic salts of a transition metal, such as cobalt, nickel, manganese or iron naphthenate, cobalt neodecanoate, cobalt stearate, copper octoate, copper acetylacetonate, iron hexoate, or iron propionate. Promoters may be used to enhance cure rate. Promoters may often be used in amounts up to about 2 percent by weight, and often about 1 part per million to about 0.5 weight percent.

Suitable additives to either the initiator part and/or the activator part include viscosity control agents, fillers (e.g., titanium dioxide), plasticizers, fragrances, pigments and so on. Viscosity control agents may include organoclays, fumed silica or the like and may be added in amounts ranging from about 0.1 to about 10 percent by weight of the adhesive composition.

Additional fillers may be added in significantly larger amounts to reduce the cost of the adhesive or to modify certain physical properties such as shrinkage and exotherm characteristics. In this case, quantity of the filler or extender would be considered separately as an additive to the base polymer and monomer composition as described above. Common particulate fillers or extenders such as clay, talc, calcium carbonate, silica, alumina trihydrate, bentonite, glass beads, etc. can be added in amounts up to about 50 percent or more of the composition by weight in order to achieve specific economic, application or bonding characteristics.

In use, each part of the adhesive is formed or compounded and stored separately in inventory by the adhesive manufacturer, a distributor or end user or any combination thereof. To apply the adhesive composition to a structure to be joined together such as a pipe joint, the initiator part and the activator part are mixed together using conventional mixers such as a static mixer known to those skilled in the art. The mixing ratio of initiator part to activator part can be anywhere from about 1:1 to about 1:100. In commercial and industrial environments, a volume ratio is commonly used for convenience. Some common mixing ratios are 1:1, 1:2, 1:4 and 1:10, but preferably 1:10, more preferably 1:4 and most preferably 1:1. Application to the structure may be using conventional means such as a douber, brush, and the like, or by injection into the joint once the pipe and fitting are joined. Application may also be to at least one mating surface of the joint before or after assembling the pipe joint.

Several adhesive formulations of the present invention were made as described hereinafter. Each adhesive formulation consists of two parts which were prepared by mixing the ingredients in separate containers just prior to use.

EXAMPLES

Ingredients

The following ingredients were used in the examples provided hereinafter:

Acrylic polymer ("Plexiglas VS-100")—Altuglas International

Acrylic polymer ("Optix CA-86")—Plaskolite, Inc

Methylmethacrylate acrylonitrile 1,3-butadiene styrene copolymer (MABS) ("TR 558A")—LG Chem, Ltd.

Methyl methacrylate (MMA)—Lucite International Inc.

Methacrylic acid (MA)—Lucite International Inc.

Hydroxyethyl methacrylate (HEMA)—Sigma-Aldrich Corporation

Ethyleneglycol dimethacrylate (EGDMA)—Sartomer Inc

Cumene hydroperoxide (CHP)—Sigma-Aldrich Corporation

4-Toluenesulfonyl chloride—Sigma-Aldrich Corporation 3,5-Diethyl-1-phenyl-2-propyl-1,2-dihydropyridine (PDHP) ("Reillycat ASY-2")—Vertellus Specialties Inc.

Cobalt neodecanoate—Sigma-Aldrich Corporation

Copper(II) acetylacetonate (CuAcAc)—Sigma-Aldrich Corporation

Ethylene thiourea (ETU)—Sigma-Aldrich Corporation

Butylated hydroxytoluene (BHT)—Sigma-Aldrich Corporation 2,6-Di-tert-butyl-4-(dimethylaminomethyl)phenol ("Ethanox 4703")—Albemarle Corporation Fumed silica ("Aerosil 200")—Evonik Industries AG Titanium dioxide ("Ti-Pure R-900")—DuPont Preparation of Monomer-Polymer Solution Stock monomer-polymer solutions were prepared by dissolving the polymers in methyl (meth)acrylate monomer. A polymer in pellet or powder form and monomer were charged to a one gallon tin plated metal can and rolled on a roller mill for 24 to 72 hours to fully dissolve the polymer in the monomer and form a homogeneous syrup-like solution with concentrations ranging from about 20-50%. The viscosity of the final formula can be adjusted by adjusting the amount of monomer.

Initiator Part

Polymer solutions, monomers, stabilizers and the Initiators Part except for the free radical initiators were added to a Max 100 plastic cup (160 ml) from FlackTek Inc. The mixing cup was placed into a dual asymmetric centrifugal FlackTek SpeedMixer (DAC 150.1 FV) by Hauschild Engineering, Germany. The contents were mixed twice consecutively for one minute each at a speed of 3,000 rpm to insure that high viscosity polymer solutions and solid ingredients were fully mixed and homogeneous. Fillers were then added to the mixing cup which was mixed for one minute at a speed of 3,000 rpm forming a homogeneous paste. After the mixture was cooled down to about room temperature, the free radical initiator was added into the mixing cup and mixed for one minute at a speed of 3,000 rpm.

Activator Part

Polymer solutions, monomers, crosslinkers, stabilizers and the Activator Part components except for the pyridinic reducing agent (dihydropyridine (PDHP)) were added to a Max 100 plastic cup (160 ml). The mixing cup was placed into a dual asymmetric centrifugal FlackTek SpeedMixer (DAC 150.1 FV). The contents were mixed twice consecutively for one minute each at a speed of 3,000 rpm to insure that high viscosity polymer solutions and solid ingredients were fully mixed and homogeneous. Fillers were then added to the mixing cup which was mixed for one minute at a speed of 3,000 rpm forming a homogeneous paste. After the mixture was cooled down to about room temperature, the pyridinic reducing agent (dihydropyridine (PDHP)) was added into the mixing cup and mixed for one minute at a speed of 3,000 rpm.

Mixing and Application of Adhesives

The Initiator Part and Activator Part were stored in the separate chambers of a 50 ml dual cartridge from Sulzer Mixpac Ltd, Switzerland in a 1:1 volume ratio respectively. The cartridge was then placed in a hand-held dispenser. A static mixer was attached to the cartridge. To apply the adhesive, the Initiator Part and Activator Part pastes were combined and mixed by the simultaneous extrusion through the static mixer, and were directly applied onto the test substrates. When Initiator Part and Activator Part pastes were mixed, free radical initiators in the Initiator Part were activated by the activators in the Activator Part to generate free radicals to initiate the polymerization of monomers. The mixed paste gradually increases viscosity and eventually is harden to form a strong bond to the substrate. Various two part acrylic adhesive compositions were then evaluated.

Lap Shear Bond Strength

Samples of the adhesive composition were evaluated to measure the lap shear bond strength and failure mode. The adhesive compositions were dispensed onto a substrate with dimensions 2 inch×1 inch×¼ inch thick (50.8 mm×25.4 mm×6.4 mm). The surface of the substrates was cleaned with methyl ethyl ketone (MEK) and dried prior to bonding. Two pieces of PETG plastic sheet (1 inch long, 0.5 inch wide, 20 mil thick) (25.4 mm×12.7 mm×0.5 mm) were used as spacer and placed to each end of the first substrate. The mixed adhesive compositions were applied and spread near the center of the substrate to cover a 1 inch×1 inch (25.4 mm×25.4 mm) area. A second substrate was brought against the adhesive compositions to form an overlap adhesive joint with 1 inch (25.4 mm) overlap. The adhesive joint was fixtured with a clamp and allowed to cure at room temperature (i.e., about 23° C.) for 24 hours. Four adhesive joints were made with each adhesive formulation. The adhesive joint was tested until failure by compression loading on a material testing machine (United Testing System, Model STM-20) equipped with a 20,000 lb. (9072 kg) load cell at a rate of 0.05 inch (1.27 mm) per minute. The lap shear strengths are an average of four measurements and are reported in psi (pound per square inch) to the nearest whole number. The debonded adhesive joints were visually inspected to determine the failure mode.

Reactivity Time and Maximum Exotherm Temperature

Reactivity time is defined as the time to reach the maximum temperature of an exothermic reaction from start of mixing a certain amount of adhesive. A time was started immediately when three grams of adhesive compositions were mixed and dispensed into a small disposable cup. A type K thermocouple connected to an Extech 421502 Digital Thermometer was then inserted into the mixed adhesive. The time elapsed in total minutes:seconds from start of mixing to the maximum-recorded temperature was recorded as reactivity time. The maximum exotherm temperature reached was recorded.

Hydrostatic Sustained Pressure Strength

Time-to-failure of plastic pipe joint prepared with the adhesive compositions under constant hydraulic pressure was determined according to the procedures described in ASTM D1598: Standard Test Method for Time-to-Failure of Plastic Pipe under Constant Internal Pressure. Some test conditions were modified and specified as herein. Used 40MM PN25 CPVC pipe and fitting to prepare a test assembly containing 2 6-inch pipes and 1 coupling. The surface of the bonded area was cleaned with methyl ethyl ketone (MEK) and dried prior to bonding. The adhesive compositions were applied and the pipe joint was cured at room temperature for 24 hours. The pipe joint was then conditioned at 180° F. (82° C.) for 96 hours and tested by applying a constant hydrostatic pressure of 288 psi until failure. Leakage or separation at the joint tested causing loss of pressure shall constitute failure.

The following examples further illustrate the embodiments of the present invention. Neither these examples nor any of the foregoing disclosure should be construed as limiting in any way the scope of the present invention. Unless otherwise indicated, all parts and percentages are by weight.

Examples 1-5

The Initiator Part and the Activator Part with various compositions of 2 different acrylic polymers of Plexiglas VS-100 and Optix CA-86, different monomers (MMA, MA, HEMA and EGDMA), CHP initiator, different accelerators (PDHP, ETU and cobalt neodecanoate), and BHT stabilizer were prepared using the procedures described above. The formulations and properties are summarized in Table 1.

TABLE 1

| | Ex. 1 | Ex. 2 | Ex. 3 | Ex. 4 | Ex. 5 |
|---|---|---|---|---|---|
| Initiator Part (WT. %) | | | | | |
| Plexiglas VS-100 | 33.29 | 33.29 | — | — | — |
| Optix CA-86 | — | — | 29 | 29 | 29 |
| Methyl methacrylate (MMA) | 47.09 | 47.09 | 51.5 | 51.5 | 51.5 |
| Methacrylic acid (MA) | 7 | 7 | 7 | 7 | 7 |
| Cumene hydroperoxide (CHP) | 2 | 2 | 1 | 1 | 1 |
| Butylated hydroxytoluene (BHT) | 0.12 | 0.12 | 1 | 1 | 1 |
| Aerosil 200 | 0.5 | 0.5 | 0.5 | 0.5 | 0.5 |
| Ti-Pure R-900 | 10 | 10 | 10 | 10 | 10 |
| Activator Part (WT. %) | | | | | |
| Plexiglas VS-100 | 33.17 | 33.26 | — | — | — |
| Optix CA-86 | — | — | 30.52 | 30.44 | 30.34 |
| Methyl methacrylate (MMA) | 44.424 | 44.284 | 53.824 | 53.704 | 53.554 |
| Hydroxyethyl methacrylate (HEMA) | 8 | 8 | — | — | — |
| Ethyleneglycol dimethacrylate (EGDMA) | 3 | 3 | 3 | 3 | 3 |
| Butylated hydroxytoluene (BHT) | 0.1 | 0.1 | 0.1 | 0.1 | 0.1 |
| PDHP (Reillycat ASY-2) | 0.8 | 0.8 | 2 | 2 | 2 |
| Cobalt neodecanoate | 0.006 | 0.006 | 0.006 | 0.006 | 0.006 |
| Ethylene thiourea (ETU) | — | 0.05 | 0.05 | 0.25 | 0.5 |
| Aerosil 200 | 0.5 | 0.5 | 0.5 | 0.5 | 0.5 |
| Ti-Pure R-900 | 10 | 10 | 10 | 10 | 10 |
| Reactivity Time | slow setting | 11'00" | 23'44" | 14'36" | 11'16" |
| Max. Exotherm Temperature (° C.)/3 g | | 88 | 27.9 | 46.2 | 55.0 |
| Lap Shear Strength on CPVC (psi) | | 2265 | 1992 | 973 | 913 |
| Lap Shear Failure Mode | | Substrate | Substrate | Adhesive | Adhesive |
| Heat resistance in 80° C. water | | Soft | Soft | Soft | Soft |

Examples 6-10

The Initiator Part and the Activator Part with various compositions of Optix CA-86 acrylic polymer, MABS TR558A impact modifier, monomers (MMA, MA and EGDMA), 2 initiators (CHP and 4-Toluenesulfonyl chloride), accelerators (PDHP, ETU CuAcAc and cobalt neodecanoate) and stabilizers (BHT and Ethanox 4703) were prepared using the procedures described above. The formulations and properties are summarized in Table 2.

TABLE 2

| | Ex. 6 | Ex. 7 | Ex. 8 | Ex. 9 | Ex. 10 |
|---|---|---|---|---|---|
| Initiator Part (WT. %) | | | | | |
| Optix CA-86 | 16.4 | 16 | 16 | 16 | 16 |
| MABS TR558A | 9.6 | 9.6 | 9.6 | 9.6 | 9.6 |
| Methyl methacrylate (MMA) | 53 | 52.4 | 52.4 | 52.4 | 52.4 |
| Methacrylic acid (MA) | 7 | 7 | 7 | 7 | 7 |
| Cumene hydroperoxide (CHP) | 2 | 2 | 2 | 2 | 2 |
| 4-Toluenesulfonyl chloride | — | 1 | 1 | 1 | 1 |
| Butylated hydroxytoluene (BHT) | 1.5 | 1.5 | 1.5 | 1.5 | 1.5 |
| Aerosil 200 | 0.5 | 0.5 | 0.5 | 0.5 | 0.5 |
| Ti-Pure R-900 | 10 | 10 | 10 | 10 | 10 |
| Activator Part (WT. %) | | | | | |
| Optix CA-86 | 18.12 | 18.12 | 17.97 | 16.74 | 16.14 |
| MABS TR558A | 9.6 | 9.6 | 9.6 | 9.6 | 9.6 |
| Methyl methacrylate (MMA) | 52.58 | 52.58 | 52.78 | 54.01 | 50.21 |
| Ethyleneglycol dimethacrylate (EGDMA) | 8 | 8 | 8 | 8 | 8 |
| Butylated hydroxytoluene (BHT) | 0.1 | 0.1 | 0.1 | — | — |
| Ethanox 4703 | — | — | — | 0.1 | 0.1 |
| PDHP (Reillycat ASY-2) | 1 | 1 | 1 | 1 | 2 |
| Cobalt neodecanoate | 0.006 | 0.006 | — | — | — |
| Copper(II) acetylacetonate (CuAcAc) | — | — | 0.00025 | 0.00025 | 0.0005 |
| Ethylene thiourea (ETU) | 0.05 | 0.05 | 0.05 | 0.05 | 0.05 |
| Aerosil 200 | 0.5 | 0.5 | 0.5 | 0.5 | 0.5 |
| Ti-Pure R-900 | 10 | 10 | 10 | 10 | 10 |
| Reactivity Time | 37' | 15'27" | 14'21" | 11'22" | 14'36" |
| Max. Exotherm Temperature (° C.)/3 g | 26.3 | 89.2 | 81.6 | 98.8 | 91.7 |
| Lap Shear Strength on CPVC (psi) | 2296 | 2356 | 2284 | 2369 | 2481 |
| Lap Shear Failure Mode | Substrate | Substrate | Substrate | Substrate | Substrate |
| Heat resistance in 80° C. water | Soft | Hard | Hard | Hard | Hard |

Several adhesive formulas were selected to perform a hydrostatic sustained pressure strength test. The test results were summarized in Table 3.

TABLE 3

| | Ex. 3 | Ex. 7 | Ex. 8 |
|---|---|---|---|
| Time to Failure (hr) | 1541 | 4836 | 5220 |
| Failure Mode | Leak at bondline | Pipe failure | Pipe failure |

* Test conditions: 180° F. & 288 psi on a 40 MM PN25 CPVC Pipe joint

The examples clearly illustrate that the adhesive compositions containing a combination of free radical initiators such as cumene hydroperoxide (CHP) and 4-toluenesulfonyl chloride, and a combination of activators such as PDHP (Reillycat ASY-2), copper (II) acetylacetonate (CuAcAc), ethylene thiourea (ETU) have superior heat and moisture resistance in 80° C. water under pressure of inventive adhesive compositions on CPVC pipe joints.

Migration Test

The migration test was performed according to the European Standard EN 12873-2:2004. The migration water collected from the CPVC pipe joints assembled with the adhesive was analyzed by GC-MS (gas chromatography-mass spectrometry). The adhesive of Example 8 was used for the migration test. The concentration of MMA monomer in the migration water was less than 300 ug/L, meeting the requirements as described in the Positive List of Monomers for Production of Organic Materials and Cementitious Products Intended for Use in Contact with Drinking Water—June 2005, Other ingredients were found to be trace amounts or undetectable within the detection limits of the analysis.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. The invention is defined by the following claims, with equivalents of the claims to be included therein.

That which is claimed:

1. A two part heat and moisture resistant acrylic adhesive composition comprising:

a) an initiator part comprising at least one homopolymer dissolved in a (meth)acrylate monomer and a free radical initiator, wherein the at least one homopolymer is selected from the group consisting of poly(methyl methacrylate) (PMMA), polystyrene (PS), polydicyclopentadiene (PDCPD), and mixtures and blends thereof; and b) an activator part comprising at least one homopolymer dissolved in a (meth)acrylate monomer, a pyridinic reducing agent, an organometallic curing promoter and a thiourea accelerator, wherein the at least one homopolymer is selected from the group consisting of poly (methyl methacrylate) (PMMA), polystyrene (PS), polydicyclopentadiene (PDCPD), and mixtures and blends thereof.

2. The two part heat and moisture resistant acrylic adhesive composition of claim 1, wherein the initiator part further comprises a toluenesulfonyl chloride co-initiator.

3. The two part heat and moisture resistant acrylic adhesive composition of claim 1, wherein the activator part further comprises a crosslinker.

4. The two part heat and moisture resistant acrylic adhesive composition of claim 3, wherein the crosslinker is ethyleneglycol dimethacrylate.

5. The two part heat and moisture resistant acrylic adhesive composition of claim 1, wherein the (meth)acrylate monomer is a $C_1$ to $C_{20}$ alkyl ester of (meth)acrylic acid.

6. The two part heat and moisture resistant acrylic adhesive composition of claim 5, wherein the $C_1$ to $C_{20}$ alkyl ester of (meth)acrylic acid is selected from the group consisting of methyl (meth)acrylate, ethyl (meth)acrylate, propyl (meth)acrylate, isopropyl (meth)acrylate, isobutyl (meth)acrylate, sec-butyl (meth)acrylate, t-butyl (meth) acrylate, tetrahydrofurfuryl (meth)acrylate, 2-ethyl hexyl (meth)acrylate, dicyclopentadienyl (meth)acrylate, isobornyl (meth)acrylate, and mixtures and blends thereof.

7. The two part heat and moisture resistant acrylic adhesive composition of claim 1, wherein the free radical initiator is cumene hydroperoxide.

8. The two part heat and moisture resistant acrylic adhesive composition of claim 1, wherein the organometallic curing promoter is an organometallic compound selected from the group consisting of cobalt, nickel, manganese or iron naphthenate, cobalt neodecanoate, copper octoate, copper acetylacetonate, iron hexoate, and iron propionate.

9. The two part heat and moisture resistant acrylic adhesive composition of claim 1, wherein the thiourea accelerator is selected from the group consisting of ethylene thiourea, 1-acetyl-2-thiourea, and 1-(2-pyridyl)-2-thiourea.

10. The two part heat and moisture resistant acrylic adhesive composition of claim 1, wherein the pyridinic reducing agent is 3,5-diethyl-1-phenyl-2-propyl-1,2-dihydropyridine (PDHP).

11. A method of bonding two objects together, the method comprising:

a) mixing an initiator part and an activator part together to form an adhesive, wherein the initiator part comprises at least one homopolymer dissolved in a (meth)acrylate monomer and a free radical initiator, wherein the at least one homopolymer is selected from the group consisting of poly (methyl methacrylate) (PMMA), polystyrene (PS), polydicyclopentadiene (PDCPD), and mixtures and blends thereof, and wherein the activator part comprises at least one homopolymer dissolved in a (meth)acrylate monomer, a pyridinic reducing agent, an organometallic curing promoter and a thiourea accelerator, wherein the at least one homopolymer is selected from the group consisting of poly(methyl methacrylate) (PMMA), polystyrene (PS), polydicyclopentadiene (PDCPD), and mixtures and blends thereof;

b) applying the adhesive to at least one surface of one of the two objects to be joined together; and c) curing the adhesive to bond the two objects together.

12. The method according to claim 11, wherein the initiator part further comprises a toluenesulfonyl chloride co-initiator.

13. The method according to claim 11, wherein the activator part further comprises a crosslinker.

14. The method according to claim 13, wherein the crosslinker is ethyleneglycol dimethacrylate.

15. The method according to claim 11, wherein the (meth)acrylate monomer is a $C_1$ to $C_{20}$ alkyl ester of (meth) acrylic acid.

16. The method according to claim 15, wherein the $C_1$ to $C_{20}$ alkyl ester of (meth)acrylic acid is selected from the group consisting of methyl (meth)acrylate, ethyl (meth) acrylate, propyl (meth)acrylate, isopropyl (meth)acrylate, isobutyl (meth)acrylate, sec-butyl (meth)acrylate, t-butyl (meth)acrylate, tetrahydrofurfuryl (meth)acrylate, 2-ethyl hexyl (meth)acrylate, dicyclopentadienyl (meth)acrylate, isobornyl (meth)acrylate, and mixtures and blends thereof.

17. The method according to claim 11, wherein the free radical initiator is selected from the group consisting of benzoyl peroxide, cumene hydroperoxide, tertiary butyl hydroperoxide, dicumyl peroxide, tertiary butyl peroxyacetate, tertiary butyl perbenzoate, and mixtures thereof.

18. The method according to claim 11, wherein the organometallic curing promoter is an organometallic compound selected from the group consisting of cobalt, nickel, manganese or iron naphthenate, cobalt neodecanoate, copper octoate, copper acetylacetonate, iron hexoate, and iron propionate.

19. The method according to claim 11, wherein the thiourea accelerator is selected from the group consisting of ethylene thiourea, 1-acetyl-2-thiourea, 1-(2-pyridyl)-2-thiourea.

20. The method according to claim 11, wherein the pyridinic reducing agent is 3,5-diethyl-1-phenyl-2-propyl-1,2-dihydropyridine (PDHP).

21. The two part heat and moisture resistant acrylic adhesive composition of claim 1, further comprising a copolymer selected from the group consisting of poly(methacrylate-acrylonitrile-butadiene-styrene) (MABS), poly (methacrylate-butadiene-styrene) (MBS), poly(acrylate-styrene-acrylonitrile) (ASA), poly(acrylonitrile-butadiene-styrene) (ABS), block copolymers of butadiene or isoprene with styrene, and mixtures and blends thereof.

22. The two part heat and moisture resistant acrylic adhesive composition of claim 21, wherein the copolymer is present in an amount of less than 10% by weight of the two part heat and moisture resistant acrylic adhesive composition.

23. The two part heat and moisture resistant acrylic adhesive composition of claim 1, wherein the initiator part and the activator part are combined in a 1:1 ratio to form an adhesive.

24. The two part heat and moisture resistant acrylic adhesive composition of claim 1, wherein the initiator part and the activator part are combined to form an adhesive and less than 300 μg/L of the (meth)acrylate monomer is present in water when the adhesive is used in a migration test performed according to European Standard EN 12873-2: 2004.

25. The two part heat and moisture resistant acrylic adhesive composition of claim 1, further comprising an organic acid accelerator.

26. The two part heat and moisture resistant acrylic adhesive composition of claim 25, wherein the organic acid accelerator is methacrylic acid.

* * * * *